United States Patent
Todd et al.

(10) Patent No.: US 10,841,240 B2
(45) Date of Patent: Nov. 17, 2020

(54) DATA DISTRIBUTION MANAGEMENT IN MOBILE NETWORK

(71) Applicant: EMC IP Holding Company LLC, Hopkinton, MA (US)

(72) Inventors: Stephen J. Todd, Center Conway, NH (US); Dragan Savic, Brookline, MA (US); Assaf Natanzon, Tel Aviv (IL); Said Tabet, Sherborn, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 140 days.

(21) Appl. No.: 16/038,325

(22) Filed: Jul. 18, 2018

(65) Prior Publication Data

US 2020/0028799 A1    Jan. 23, 2020

(51) Int. Cl.
| | |
|---|---|
| *H04L 12/26* | (2006.01) |
| *H04L 12/911* | (2013.01) |
| *H04W 4/029* | (2018.01) |
| *H04L 12/927* | (2013.01) |

(52) U.S. Cl.
CPC .......... *H04L 47/823* (2013.01); *H04L 47/741* (2013.01); *H04L 47/822* (2013.01); *H04L 47/824* (2013.01); *H04L 47/801* (2013.01); *H04W 4/029* (2018.02)

(58) Field of Classification Search
CPC .................................................... H04L 47/741
See application file for complete search history.

(56) References Cited

U.S. PATENT DOCUMENTS

| | | | | |
|---|---|---|---|---|
| 6,181,945 | B1 * | 1/2001 | Lee ........................ | H04W 68/04 340/7.24 |
| 9,648,538 | B2 * | 5/2017 | Ganesan ................ | H04M 1/725 |
| 2010/0081468 | A1 * | 4/2010 | Brothers ............. | H04L 67/2861 455/515 |
| 2012/0100871 | A1 * | 4/2012 | Zhao ..................... | H04W 68/04 455/456.1 |
| 2015/0277983 | A1 * | 10/2015 | Chen ..................... | G06F 9/5083 718/104 |

(Continued)

OTHER PUBLICATIONS

U.S. Appl. No. 15/898,443, filed in the name of Kelly G. Kanellakis et al. filed Feb. 17, 2018 and entitled "Ad-Hoc Mobile Computing."

*Primary Examiner* — Guang W Li
(74) *Attorney, Agent, or Firm* — Ryan, Mason & Lewis, LLP

(57) ABSTRACT

In a system environment comprising a plurality of computing resources, wherein at least a portion of the computing resources are mobile, a method manages a transfer of one or more portions of a data set between at least a subset of the plurality of computing resources in accordance with a data distribution process. The data distribution process comprises computing one or more probability values to estimate whether or not a given mobile computing resource that is seeking at least a portion of the data set will be in a vicinity of at least one other computing resource that currently has or can obtain the portion of the data set, and based on the computation step, causing a transfer of the portion of the data set to the given mobile computing resource over a communication link locally established between the two computing resources when in the vicinity of one another.

20 Claims, 6 Drawing Sheets

(56) References Cited

U.S. PATENT DOCUMENTS

| | | | |
|---|---|---|---|
| 2017/0251339 A1* | 8/2017 | Addepalli | H04W 72/0406 |
| 2017/0339224 A1* | 11/2017 | Condeixa | H04L 67/1095 |
| 2018/0053215 A1* | 2/2018 | e Costa | G06Q 30/0266 |
| 2018/0376305 A1* | 12/2018 | Ramalho de Oliveira | H04W 4/44 |
| 2018/0376306 A1* | 12/2018 | Ramalho de Oliveira | H04W 4/44 |
| 2018/0376357 A1* | 12/2018 | Tavares Coutinho | H04L 67/32 |
| 2019/0068434 A1* | 2/2019 | Moreira da Mota | H04L 41/0806 |
| 2019/0174276 A1* | 6/2019 | Mineiro Ramos de Azevedo | H04W 4/38 |
| 2020/0007464 A1* | 1/2020 | Lo | H04L 9/0643 |

\* cited by examiner

502 — IN A SYSTEM ENVIRONMENT COMPRISING A PLURALITY OF COMPUTING RESOURCES, WHEREIN AT LEAST A PORTION OF THE COMPUTING RESOURCES ARE MOBILE, A GIVEN MOBILE COMPUTING RESOURCE SENDING A NOTIFICATION MESSAGE TO AT LEAST ONE OTHER COMPUTING RESOURCE OF THE PLURALITY OF COMPUTING RESOURCES, THAT CURRENTLY HAS OR CAN OBTAIN AT LEAST A PORTION OF A DATA SET, TO RETAIN THE PORTION OF THE DATA SET WHEN ONE OR MORE PROBABILITY VALUES ESTIMATE THAT THE GIVEN MOBILE COMPUTING RESOURCE WILL BE IN A VICINITY OF THE OTHER COMPUTING RESOURCE

504 — THE GIVEN MOBILE COMPUTING RESOURCE RECEIVING THE PORTION OF THE DATA SET FROM THE OTHER COMPUTING RESOURCE OVER A COMMUNICATION LINK LOCALLY ESTABLISHED BETWEEN THE GIVEN MOBILE COMPUTING RESOURCE AND THE OTHER COMPUTING RESOURCE WHEN IN THE VICINITY OF ONE ANOTHER

512 — IN A SYSTEM ENVIRONMENT COMPRISING A PLURALITY OF COMPUTING RESOURCES, WHEREIN AT LEAST A PORTION OF THE COMPUTING RESOURCES ARE MOBILE, A GIVEN STATIONARY COMPUTING RESOURCE OF THE PLURALITY OF COMPUTING RESOURCES RECEIVING A NOTIFICATION MESSAGE FROM AT LEAST ONE MOBILE COMPUTING RESOURCE OF THE PLURALITY OF COMPUTING RESOURCES TO RETAIN A PORTION OF A DATA SET WHEN ONE OR MORE PROBABILITY VALUES ESTIMATE THAT THE MOBILE COMPUTING RESOURCE WILL BE IN A VICINITY OF THE GIVEN STATIONARY COMPUTING RESOURCE

514 — THE GIVEN STATIONARY COMPUTING RESOURCE SENDING THE PORTION OF THE DATA SET TO THE MOBILE COMPUTING RESOURCE OVER A COMMUNICATION LINK LOCALLY ESTABLISHED BETWEEN THE GIVEN STATIONARY COMPUTING RESOURCE AND THE MOBILE COMPUTING RESOURCE WHEN IN THE VICINITY OF ONE ANOTHER

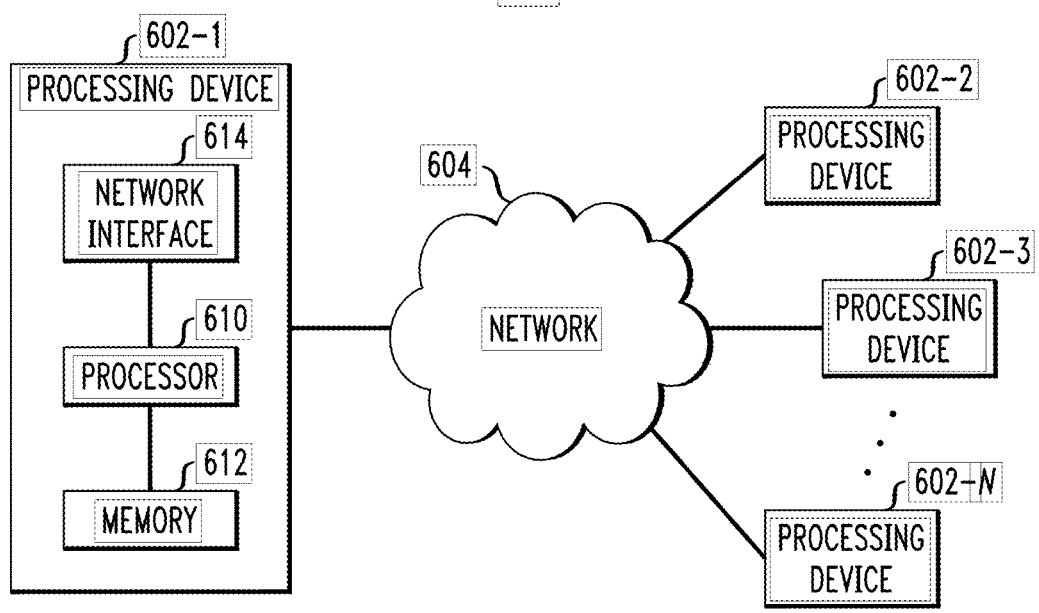

DATA DISTRIBUTION MANAGEMENT IN MOBILE NETWORK

FIELD

The field relates generally to networks of computing resources, and more particularly to techniques for data management in such networks of computing resources.

BACKGROUND

Enterprises or other entities typically have a large information technology (IT) infrastructure comprising a network of computing resources distributed across a geographic environment. In many scenarios, these computing resources are mobile and may be referred to as mobile compute platforms. These mobile compute platforms, along with servers that communicate with the mobile compute platforms, collectively form a highly distributed system. Mobile compute platforms may be in a variety of forms including, but not limited to, employee mobile devices, customer mobile devices, vehicles (e.g., drones, planes, cars, trucks, other shipping transports, etc.), Internet of Things (IoT) devices (e.g., sensors, tags, other monitoring or display systems, etc.), etc.

It is often necessary to distribute data sets to these mobile compute platforms, many of which are continuously moving. However, data distribution in such highly distributed systems can be very challenging due to issues such as, for example, communication bandwidth.

SUMMARY

Embodiments of the invention provide techniques for data distribution management in a mobile network of computing resources such as, by way of example, a highly distributed system.

For example, in an illustrative embodiment, a method comprises the following steps. In a system environment comprising a plurality of computing resources, wherein at least a portion of the computing resources are mobile, the method manages a transfer of one or more portions of a data set between at least a subset of the plurality of computing resources in accordance with a data distribution process. The data distribution process comprises computing one or more probability values to estimate whether or not a given mobile computing resource of the plurality of computing resources that is seeking at least a portion of the data set will be in a vicinity of at least one other computing resource of the plurality of computing resources that currently has or can obtain the portion of the data set, and based on the one or more computed probability values, causing a transfer of the portion of the data set to the given mobile computing resource over a communication link locally established between the given mobile computing resource and the other computing resource when in the vicinity of one another.

In another illustrative embodiments, a method comprises the following steps. In a system environment comprising a plurality of computing resources, wherein at least a portion of the computing resources are mobile, a given mobile computing resource sends a notification message to at least one other computing resource of the plurality of computing resources, that currently has or can obtain at least a portion of a data set, to retain the portion of the data set when one or more probability values estimate that the given mobile computing resource will be in a vicinity of the other computing resource. The given mobile computing resource receives the portion of the data set from the other computing resource over a communication link locally established between the given mobile computing resource and the other computing resource when in the vicinity of one another.

In a further illustrative embodiment, a method comprises the following steps. In a system environment comprising a plurality of computing resources, wherein at least a portion of the computing resources are mobile, a given stationary computing resource of the plurality of computing resources receives a notification message from at least one mobile computing resource of the plurality of computing resources to retain a portion of a data set when one or more probability values estimate that the mobile computing resource will be in a vicinity of the given stationary computing resource. The given stationary computing resource sends the portion of the data set to the mobile computing resource over a communication link locally established between the given stationary computing resource and the mobile computing resource when in the vicinity of one another.

Advantageously, illustrative embodiments provide a data distribution process that attempts to maximize the amount of data transferred over the communication link locally established between computing resources in the system environment so as to minimize the amount of data that would otherwise be transferred to a given computing resource over a cellular communication link.

Illustrative embodiments also provide a message framework comprising a set of predefined messages exchangeable between the plurality of computing resources in the system environment.

These and other features and advantages of the invention will become more readily apparent from the accompanying drawings and the following detailed description.

BRIEF DESCRIPTION OF THE DRAWINGS

FIGS. 5A and 5B are methodologies for data distribution management associated with a highly distributed system according to illustrative embodiments.

FIG. 6 illustrates a processing platform used to implement a highly distributed system with data distribution management according to an illustrative embodiment.

DETAILED DESCRIPTION

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid clouds) with a vast array of computing resources attached to or otherwise a part of such IT infrastructure.

Illustrative embodiments provide techniques for data distribution management in an information processing system comprising a plurality of mobile compute platforms. Such mobile compute platforms comprise one or more mobile computing resources. The term "computing resource," as illustratively used herein, can refer to any device, endpoint, component, element, or other resource, that is capable of performing processing and/or storage functions and is capable of communicating with the system. As mentioned above, non-limiting examples of such mobile compute platforms include employee mobile devices, customer mobile devices, vehicles (e.g., drones, planes, cars, trucks, other shipping transports, etc.), Internet of Things (IoT) devices (e.g., sensors, tags, other monitoring or display systems, etc.), etc.

An information processing system that comprises such diverse and distributed computing resources, at least some of which are mobile, is illustratively referred to herein as a highly distributed system. An example of a highly distributed system environment is shown in FIG. 1.

Figure 1:
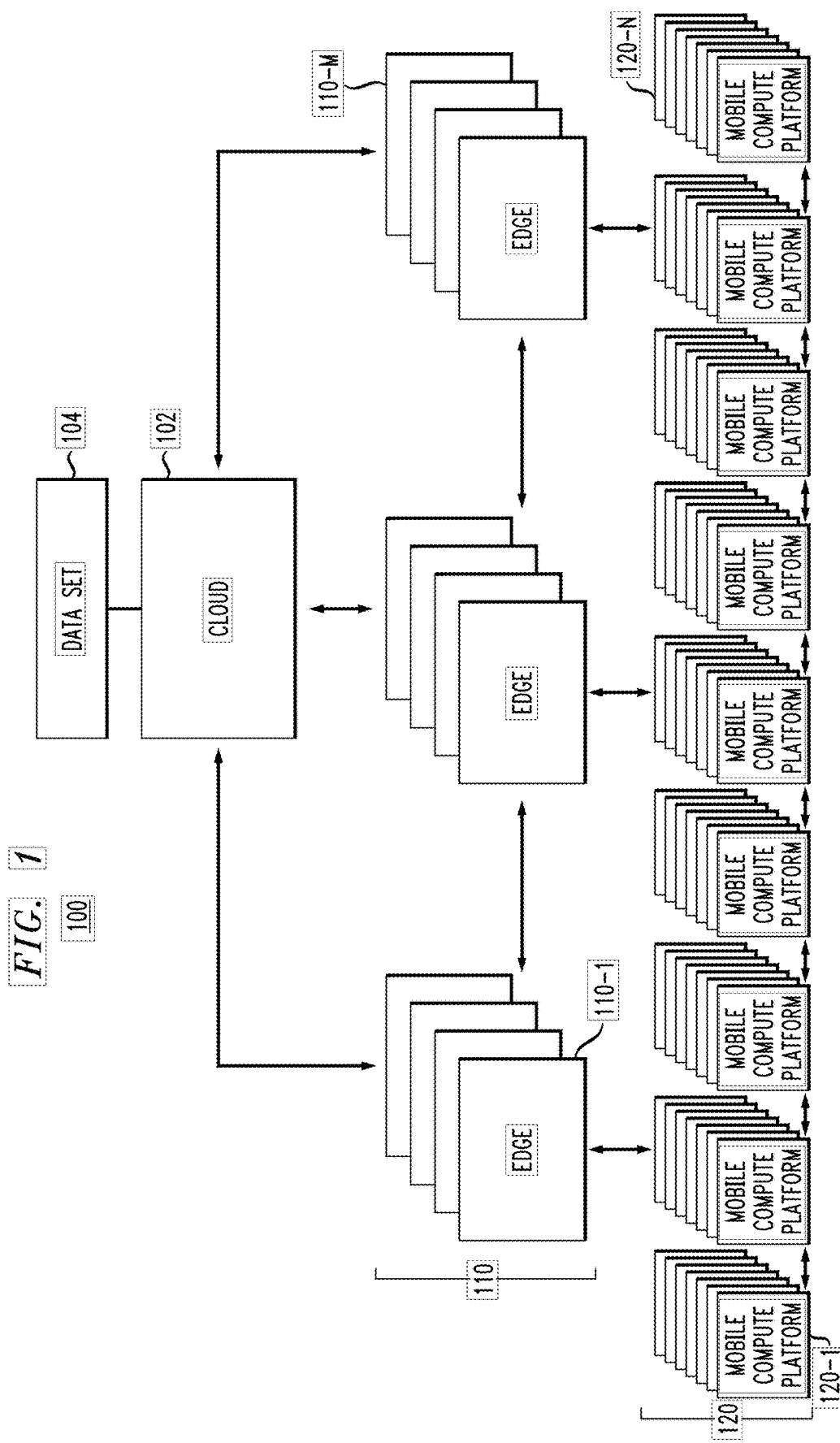
FIG. 1 illustrates a highly distributed system environment with which one or more illustrative embodiments are implemented.

As shown in FIG. 1, highly distributed system environment 100 comprises a cloud platform 102 that contains a data set 104 that the cloud platform seeks to push out, through an intermediary layer 110 with a plurality of edge servers 110-1 through 110-M, to computing resources in a bottom layer 120 that are part of a plurality of mobile compute platforms (MCPs) 120-1 through 120-N. Note that the cloud platform 102 and the edge servers 110-1 through 110-M may be considered computing resources as well. The cloud platform 102 may comprise a public cloud or a private cloud. Examples of public clouds may include, but are not limited to, Amazon Web Services® (AWS), Google Compute Engine® (GCE), and Windows Azure® Services platforms. The highly distributed system environment may employ heterogeneous and varied network connections, from carrier-grade service level agreement (SLA)-capable networks to torrent-like, peer-to-peer networks.

Furthermore, the highly distributed system environment may comprise communication connections (links) associated with one or more wireless networks such as one or more cellular networks and one or more local wireless networks such as, e.g., WiFi networks. For example, one or more of MCPs 120-1 through 120-N may be in communication with other computing resources in the system environment 100 (e.g., one or more other of MCPs 120-1 through 120-N, one or more edge servers 110-1 through 110-M, cloud platform 102, and/or one or more other devices not expressly shown in FIG. 1) via one or more communication links as will be further explained.

Highly distributed system environment 100 in FIG. 1 represents a variety of use cases in which frequent downloads of massive data sets occurs to MCPs. For example, it may be necessary or desired to download a large data set to a set of MCPs comprising passenger vehicles, drones, shipping vehicles, employee devices, etc. It is to be appreciated that many of these MCP devices are compute-constrained (e.g., configured with limited processing capabilities, as well as with limited storage, network, and other resource-related capabilities). The data being transferred may represent any kind of data, by way of example only, new software downloads, maps, customer information, weather pattern data, etc. Note that while the illustrative descriptions herein relate to data download use cases (i.e., data transferring from the cloud platform 102 to MCPs 120-1 through 120-N), the same architecture shown in highly distributed system environment 100 may be used for data upload use cases (i.e., data transferring from MCPs 120-1 through 120-N to the cloud platform 102) as well.

For example, in illustrative embodiments, FIG. 1 represents a "connected car" system environment that comprises a network of MCPs residing in autonomous cars (self-driven vehicles) and/or non-autonomous cars (human-driven vehicles) that are configured to receive data from and send data to: (i) fixed (stationary) computing resources such as edge servers associated with traffic control infrastructure such as, but not limited to, electronic road signs and traffic lights (i.e., road signs and traffic lights that, respectively, have some level of computing, storage and/or electronic data communication capabilities); (ii) one or more other MCPs; and/or (iii) other computing resources. In some embodiments, data that is transferred in the system environment can originate and/or terminate at a cloud platform (e.g., cloud platform 102) depending on the direction of data flow. The communication capabilities of a connected car and road signs can include cellular and local wireless (e.g., WiFi) communication equipment for sending and receiving data.

However, it is realized herein that transfers of data sets to MCPs (especially frequent transfers of large data sets) run into a variety of problems, examples of which will now be described.

Limited Bandwidth. The amount of network bandwidth required for communication (two-way) between computing resources in the system environment 100 of FIG. 1 is not sufficient to handle the massive amount of data movement required to frequently download new, large data sets to hundreds of thousands of MCPs.

Different bandwidth allocation between road sign to cloud and car to cloud. Some roadside units such as road signs (e.g., one of edge servers 110-1 through 110-M) have a line connection to the cloud (e.g., cloud platform 102) allowing much higher bandwidth. Road signs may also have large storage capacity, which can be leveraged to transfer data from such roadside units to cars. In addition, the management of the bandwidth may benefit from other functionality not available in the cars or in general within MCPs. Note also that, in some embodiments, a roadside unit does not necessarily have to be traffic control infrastructure but rather can be any computing resource with compute, storage and/or communication capabilities that resides along a given route.

Insufficient compute resources. The hardware located within the MCPs often does not possess enough storage, memory, compute, and network capabilities. Further, the software deployed within these platforms is limited by the above-mentioned constraints.

Ad-hoc connectivity. MCPs go in and out of range for certain geographic zones, and in some scenarios, they may completely drop their connectivity.

Data management and bandwidth management. There may be significant available bandwidth between cars and between cars and roadside units, which is not cellular-based. However, it is difficult to leverage this bandwidth when the data required does not exist in the other car or roadside unit.

Illustrative embodiments overcome the above and other drawbacks associated with data distribution in highly distributed systems such as, for example, system environment 100 in FIG. 1. However, it is to be understood that embodiments are applicable to system environments other than the system environment shown in FIG. 1.

More particularly, in a connected car system environment as described above, at least some MCPs in the system environment know the target destination and the route of the vehicles in which they reside. For example, the MCP may be an internal car navigation system or navigation software operating on a smartphone within the vehicle. In a fully autonomous car environment, the destination and route should always be known.

Of course, destinations may change during the course of the route traversal, and also changes in traffic and the context of the journey may also cause change to the routes. However, illustrative embodiments realize that regardless of these changes, as an MCP in a vehicle comes in the vicinity of a roadside unit or another vehicle such that a communication link is available, an ad hoc network is formed for a sufficiently acceptable limited amount of time.

Thus, in accordance with one or more illustrative embodiments, a given MCP (e.g. an MCP of layer 120 in FIG. 1) in a vehicle computes: (i) the probability that it will reach a given roadside unit, such as a traffic light or some other traffic control infrastructure, that stores all or part of a given data set that the given MCP seeks (e.g., in at least one illustrative embodiment, the probability estimated is the probability that the route will not change such that the given MCP will not pass the given roadside unit); and (ii) the amount of bandwidth the given MCP will be able to consume from the given roadside unit. The given MCP then downloads one or more maps (one or more data sets) from the given roadside unit once it comes into a vicinity of the given roadside unit and can therefore establish a communication link therebetween. One example is shown in FIG. 2.

Figure 2:
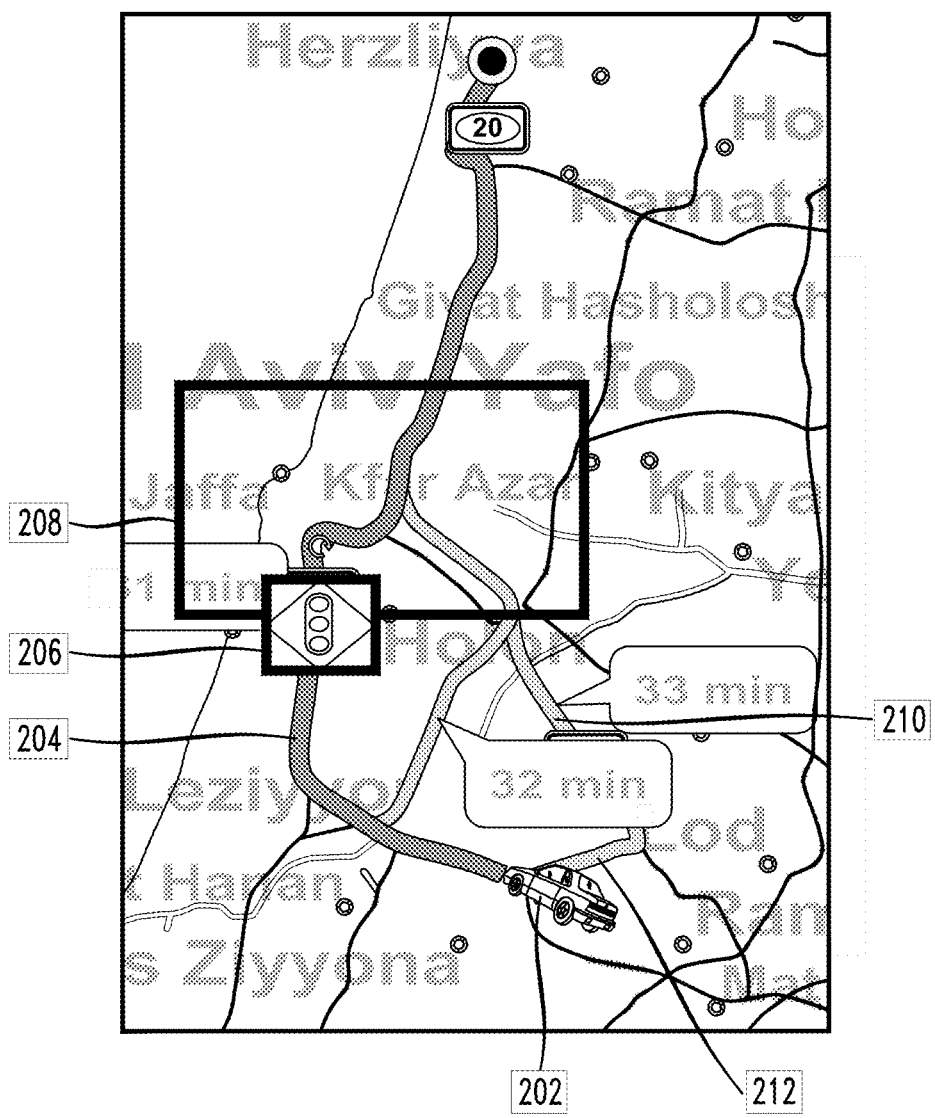
FIG. 2 illustrates an example of a mobile device downloading data from a stationary device in a highly distributed system according to an illustrative embodiment.

FIG. 2 illustrates an example 200 of a mobile device (e.g., MCP of layer 120 in FIG. 1) downloading data from a stationary device (e.g., edge server of layer 110 in FIG. 1 such as a roadside unit) in a highly distributed system according to an illustrative embodiment. More particularly, assume that an MCP in vehicle 202 is traveling on a current route 204 (to a given destination) on which the vehicle 202 will pass a roadside unit 206 (illustrated as a traffic light device, although roadside unit 206 can be any other type of roadside unit). Assume that the roadside unit 206 stores a high definition map of the rectangular geographic area 208 which the MCP in vehicle 202 seeks to download for navigation purposes through the rectangular geographic area 208. Note also that example 200 illustrates two alternative routes 210 and 212 that would take the vehicle 202 to the same given destination with presumably longer route traversal times than the current route 204 or be undesirable for some other reason. Also, importantly, note that the given roadside unit 206 is not located along either of alternative routes 210 and 212.

Thus, in example 200, the MCP of the vehicle 202 seeks to download the high definition map for the rectangular geographic area 208 from the roadside unit 206. The roadside unit 206 is configured to not only hold a map of the given surrounding geographic area but also download updates for the given area such that MCPs download the map(s) from the roadside unit 206 when they are in proximity (using car-to-road sign connectivity).

It is assumed that a map generation source (e.g., a cloud platform 102 and/or some other edge server in layer 110 of FIG. 1) is configured with information identifying locations of roadside units, and such map generation sources, in some embodiments, have higher-bandwidth connections to the roadside units than the MCPs. The system environment (e.g., 100 in FIG. 1) therefore optimizes bandwidth usage by downloading a data set to roadside units (such as roadside unit 206) and from there to MCPs in vehicles (such as vehicle 202) thereby eliminating a need to directly download the dataset to all MCPs in the system environment. Data distribution management methodologies (algorithms) that are configured to perform such optimization will be further described below.

Illustrative embodiments also provide techniques whereby MCPs in vehicles driving in opposite, same, or similar directions are able to transmit data to each other. More particularly, in one or more illustrative embodiments, a given MCP computes a probability of the meeting (e.g., in at least one illustrative embodiment, the probability estimated is the probability that the routes of the MCPs will not change). By "meeting" here it is meant that the two MCPs are in a vicinity of one another so as to be able to establish a communication link therebetween. The routes of the two MCPs could be in opposite directions or same/similar directions, so long as there is a point or location at which they would meet or intersect. The MCPs also coordinate in advance which data can be transmitted between them. In one or more illustrative embodiments, when there is a predetermined level of probability that another car will need data, a given MCP maintains the data it downloaded for a longer period and will not delete it. One example is shown in FIG. 3.

Figure 3:
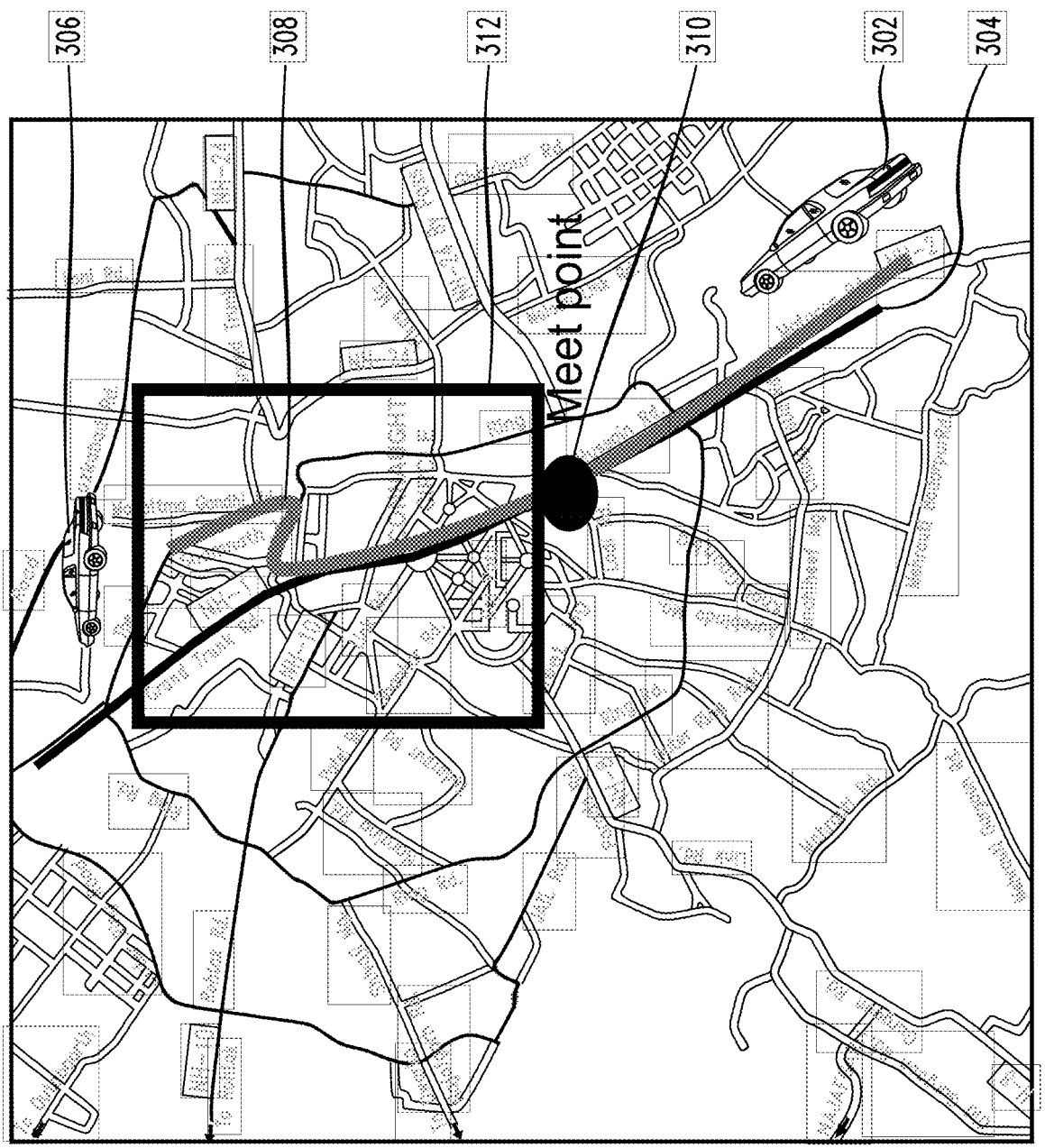
FIG. 3 illustrates an example of a mobile device downloading data from another mobile device in a highly distributed system according to an illustrative embodiment.

FIG. 3 illustrates an example 300 of a mobile device (e.g., MCP 120-1 in FIG. 1) downloading data from another mobile device (e.g., MCP 120-2 in FIG. 1) in a highly distributed system according to an illustrative embodiment. More particularly, assume that an MCP in vehicle 302 is traveling on a current route 304 (to a given destination) while an MCP in vehicle 306 is traveling on a current route 308 (to another given destination) and that the two routes 304 and 308 will come close enough to one another that there is a high probability that the two MCPs in vehicles 302 and 306 will meet at meeting point 310. Again, by "meeting" here it is meant that the two MCPs are in a vicinity of one another so as to be able to establish a communication link therebetween. Also, assume that the MCP in vehicle 306 has previously downloaded a high definition map of a rectangular geographic area 312 from another MCP and/or a roadside unit (both not expressly shown in FIG. 3). In accordance with one or more illustrative embodiments, the MCP in vehicle 306 maintains the high definition map, that it previously downloaded, and sends one or more portions of the map to the MCP in vehicle 302 when both MCPs establish a communication link at meeting point 310.

It is to be appreciated that even though each MCP may only be storing a fraction of a download, the applications that are accessing that file (e.g., vehicle navigation system or software) may desire to access the entire download. That is, in some embodiments, each MCP to MCP transfer, or MCP to roadside unit transfer, transfers only a fraction (e.g., $1/64^{th}$) of a download. Then, a full download of a given map region may be achieved from multiple cars and/or roadside units, while remaining parts of the map may need to be downloaded directly from a cellular network.

In U.S. Ser. No. 15/898,443, filed on Feb. 17, 2018 and entitled "Ad-Hoc Mobile Computing," the disclosure of which is incorporated by reference herein in its entirety, an architecture is described in which "nearby" mobile compute platforms can be combined to form a "computer" in which the CPUs, memory, network, and storage are built-up/torn-down to perform compute tasks. Such architecture could create a full "virtual download" and quickly access missing chunks by paging them in from other MCPs and/or other sources.

As mentioned, illustrative embodiments employ one or more algorithms that maximize a probability for obtaining information with minimal mobile network (e.g., cellular network) usage.

For example, in some embodiments as mentioned, an algorithm estimates the probability for a meeting between an MCP and a roadside unit, and/or a probability for a meeting between two MCPs. For each such meeting, the algorithm estimates the probability for portions of needed information to exist, and the probability that the portion can be downloaded. Based on such probabilities, the probability that all portions of the information can be downloaded from other MCPs and/or roadside units is computed, and the algorithm attempts to minimize the probability that the cellular network will be used. For example, assume there is 95% chance computed that all of the information can be downloaded from one or more roadside units or MCPs, then the cellular network will be used for less than 5% of the data traffic. This is advantageous since cellular data transfer is more costly than local WiFi data transfer.

Advantageously, in accordance with illustrative embodiments, a data distribution algorithm creates an opportunistic plan and notifies MCPs and roadside units about which information to download and which information to retain for transfer.

Figure 4:
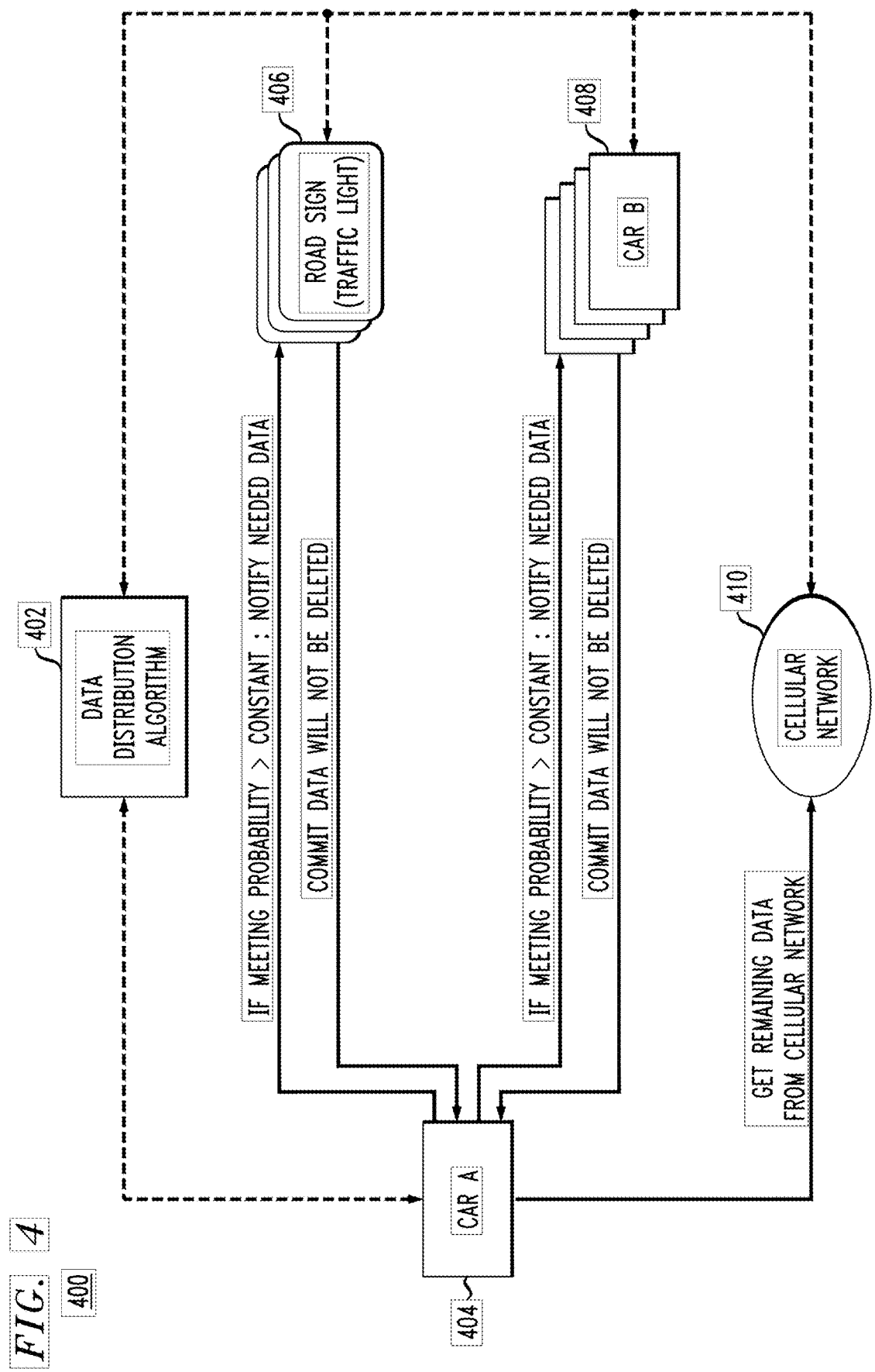
FIG. 4 illustrates a data distribution algorithm in a highly distributed system according to an illustrative embodiment.

FIG. 4 illustrates a data distribution algorithm in a highly distributed system 400 according to an illustrative embodiment. As shown, a data distribution algorithm 402 is operatively coupled to a first MCP in a vehicle 404 ("Car A"), a roadside unit 406 ("Road sign (traffic light)"), a second MCP in a vehicle 408 ("Car B"), and a cellular network 410. It is to be understood that the number of computing resources in system 400 is illustrative and for purposes of ease of explanation. As such, the data distribution algorithm is configured to operate with less or more computing resources than those shown in FIG. 4.

Furthermore, in one or more embodiments, the data distribution algorithm 402 resides in one or more computing resources in the highly distributed system environment 400 such as 404, 406 and/or 408. However, in other illustrative embodiments, the data distribution algorithm 402 resides in one or more computing resources in the environment separate from 404, 406 and 408. Still further, in some illustrative embodiments, the algorithm 402 is distributed in 404, 406 and 408, as well as in one or more separate computing resources. Also, in some embodiments, parts of the algorithm 402 can reside on the cellular network 410. Regardless of where components of the algorithm 402 reside, each component is configured to perform its portion of the algorithm 402 and communicate with each other component as needed. As will be further explained, the data distribution algorithm 402 is configured to employ a messaging framework with predefined messages as well as customizable messages that are exchanged between components.

Note that as shown in FIG. 4, it is assumed that the data distribution algorithm 402 is distributed between 404, 406, 408, and 410 (as denoted by the dashed lines).

In one illustrative embodiment, data distribution algorithm 402 performs the following operations:

(1) Create and/or obtain a route for a given vehicle (i.e., Car A 404).

(2) Perform operations associated with roadside units (e.g., Road sign 406):
   For each road side unit on the route, estimate the amount of relevant information available in the unit.
   If the amount is lower than what can be transferred between the roadside unit and the car, download more data to the roadside unit.
   When Car A arrives near the roadside unit, download the required data.

(3) Perform operations associated with the other car (i.e., Car B 408):
   Estimate the probability that the car route (of Car B) will intersect the route of Car A.
   Estimate the intersection location.
   Estimate which data will be relevant to Car A in the intersection location.
   If intersection probability is high enough (at or over a predetermined threshold probability value or constant), and relevant data exists, notify Car B to retain the data until meeting Car A. This is depicted in FIG. 4 by the step "If meeting probability is greater than a constant: Notify needed data." That is, once the meeting probability is above the threshold value, then notify the other vehicle that data is needed, which triggers the resource to commit that the required data will not be deleted (i.e., the relevant data will be retained). As shown in FIG. 4, a similar probability comparison and commit can be done between Car A and Road sign 406.

(4) Perform operations associated with the cellular network (410):
   Estimate the probability that data will be needed and not available to download the needed data from roadside units or other cars.
   Start downloading data from cellular network when risk of not getting data from other cars or roadside units is larger than a predetermined threshold value. This is depicted in FIG. 4 by the step "Get remaining data from cellular network."

As mentioned, the algorithm 402 deploys a messaging framework between vehicles that comprises predefined messages such as, but not limited to, "do you have the portion of the map that I need", and then, "I see you are coming, don't delete your section of a map because I want to ask you for it". However, the data distribution algorithm 402 is configured to also generate customizable messages that provide customized instructions derived for the particular download action depending on the circumstances.

Given the illustrative description of data distribution management techniques described herein, methodology 500 in FIG. 5A comprises the following steps from the perspective of a mobile computing resource.

Step 502: In a system environment comprising a plurality of computing resources, wherein at least a portion of the computing resources are mobile, a given mobile computing resource sends a notification message to at least one other computing resource of the plurality of computing resources, that currently has or can obtain at least a portion of a data set, to retain the portion of the data set when one or more probability values estimate that the given mobile computing resource will be in a vicinity of the other computing resource.

Step 504: The given mobile computing resource receives the portion of the data set from the other computing resource over a communication link locally established between the given mobile computing resource and the other computing resource when in the vicinity of one another.

Methodology 510 in FIG. 5B comprises the following steps from the perspective of a stationary computing resource.

Step 512: In a system environment comprising a plurality of computing resources, wherein at least a portion of the computing resources are mobile, a given stationary computing resource of the plurality of computing resources receives a notification message from at least one mobile computing resource of the plurality of computing resources to retain a portion of a data set when one or more probability values estimate that the mobile computing resource will be in a vicinity of the given stationary computing resource.

Step 514: The given stationary computing resource sends the portion of the data set to the mobile computing resource over a communication link locally established between the given stationary computing resource and the mobile computing resource when in the vicinity of one another.

At least portions of the system for data distribution management shown in FIGS. 1-5B may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors.

As is apparent from the above, one or more of the processing modules or other components of the system for data distribution management shown in FIGS. 1-5B may each run on a computer, server, storage device or other processing platform element. A given such element may be viewed as an example of what is more generally referred to herein as a "processing device." An example of such a processing platform is processing platform 600 shown in FIG. 6.

The processing platform 600 in this embodiment comprises a plurality of processing devices, denoted 602-1, 602-2, 602-3, . . . , 602-N, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 of the example embodiment of FIG. 6 is network interface circuitry 614, which is used to interface the processing device with the network 604 and other system components and may comprise conventional transceivers.

The other processing devices 602 of the processing platform 600 are assumed to be configured in a manner similar to that shown for processing device 602-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of the system for data distribution management, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the system for data distribution management. Such components can communicate with other elements of the system over any type of network or other communication media.

As indicated previously, in some embodiments, components of the system for data distribution management as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems for data distribution management. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
in a system environment comprising a plurality of computing resources, wherein at least a portion of the computing resources are mobile;
managing a transfer of one or more portions of a data set between at least a subset of the computing resources in accordance with a data distribution process, wherein the data distribution process comprises:
computing one or more probability values to estimate whether or not a given mobile computing resource of the plurality of computing resources that is seeking at least a portion of the data set will be in a vicinity of at least one other computing resource of the plurality of computing resources that currently has or can obtain the portion of the data set; and
based on the one or more computed probability values, causing a transfer of the portion of the data set to the given mobile computing resource over a communication link locally established between the given mobile computing resource and the other computing resource when in the vicinity of one another;
wherein the data distribution process further comprises one or more algorithms configured to compute the one or more computed probability values, the one or more algorithms further configured to deploy a messaging framework to provide instructions to the at least a subset of the computing resources related to the transfer of the portion of the data set to the given mobile computing resource;
wherein the one or more algorithms of the data distribution process are further configured to maximize the amount of data of the portion of the data set that is transferred over the communication link locally established between the given mobile computing resource and the other computing resource when in the vicinity of one another and to minimize the amount of data of the portion of the data set that would otherwise be transferred to the given mobile computing resource over a communication link between the given mobile computing resource and a cellular network in cellular communication with the other computing resource; and
wherein the data distribution process of the managing step is performed via one or more processing devices in the system environment, each of the one or more processing devices comprising a processor coupled to a memory.

2. The method of claim 1, wherein the one or more algorithms of the data distribution process are further configured to compute an amount of bandwidth that the portion of the data set consumes and determine whether the given mobile computing resource is currently configured with the computed amount of bandwidth.

3. The method of claim 1, wherein the given mobile computing resource is a first mobile computing platform in a vehicle and the other computing resource is a second mobile computing platform in another vehicle estimated to be in the vicinity of one another at an intersection location along respective paths that each vehicle is currently traversing.

4. The method of claim 3, wherein computing one or more probability values by the data distribution process further comprises estimating the intersection location of the first and second mobile computing platforms, and wherein estimating the intersection location is performed by the one or more algorithms of the data distribution process.

5. The method of claim 4, wherein computing one or more probability values further comprises estimating which one or more portions of the data set currently residing on the second mobile computing platform will be relevant to the first mobile computing platform when the intersection location is reached, wherein estimating which one or more portions of the data set is performed by the one or more algorithms of the data distribution process.

6. The method of claim 5, wherein when the probability of intersection between the first and second mobile computing platforms is at or above a threshold value, and one or more relevant portions of the data set are estimated to reside on the second mobile computing platform, the one or more algorithms of the data distribution process are further configured to facilitate delivery of a notification to be sent to the second mobile computing platform to retain the one or more relevant portions of the data set for transfer to the first mobile computing platform at the intersection location.

7. The method of claim 1, wherein the given mobile computing resource is a mobile computing platform in a vehicle and the other computing resource is a stationary computing resource estimated to be in the vicinity of one another along a path that the vehicle is currently traversing.

8. The method of claim 7, wherein the one or more algorithms of the data distribution process is further configured to estimate the amount of the data set available in the stationary computing resource.

9. The method of claim 8, wherein when the amount of the data set available at the stationary computing resource is lower than an amount of bandwidth available to transfer data between the stationary computing resource and the given mobile computing resource, the one or more algorithms of the data distribution process is further configured to cause the transfer of one or more additional portions of the data set to the stationary computing resource.

10. A method comprising:
in a system environment comprising a plurality of computing resources, wherein at least a portion of the computing resources are mobile;
a given mobile computing resource sending a notification message to at least one other computing resource of the plurality of computing resources, that currently has or can obtain at least a portion of a data set, to retain the portion of the data set when one or more probability values estimate that the given mobile computing resource will be in a vicinity of the other computing resource; and
the given mobile computing resource receiving the portion of the data set from the other computing resource over a communication link locally established between the given mobile computing resource and the other computing resource when in the vicinity of one another;
wherein the one or more probability values are computed by one or more algorithms of a data distribution process, the one or more algorithms configured to deploy a messaging framework to send the notification message to the at least one other computing resource; and
wherein the one or more algorithms of the data distribution process are further configured to maximize the amount of data of the portion of the data set that is transferred over the communication link locally established between the given mobile computing resource and the other computing resource when in the vicinity of one another and to minimize the amount of data of the portion of the data set that would otherwise be transferred to the given mobile computing resource over a communication link between the given mobile computing resource and a cellular network in cellular communication with the other computing resource.

11. The method of claim 10, wherein the given mobile computing resource is a first mobile computing platform in a vehicle and the other computing resource is a second mobile computing platform in another vehicle estimated to be in the vicinity of one another at an intersection location along respective paths that each vehicle is currently traversing.

12. The method of claim 10, wherein the given mobile computing resource is a mobile computing platform in a vehicle and the other computing resource is a stationary computing resource estimated to be in the vicinity of one another along a path that the vehicle is currently traversing.

13. An article of manufacture comprising a non-transitory processor-readable storage medium having stored therein program code of one or more software programs, wherein the program code when executed by at least one processing device causes the processing device to perform the steps of claim 10.

14. An apparatus comprising at least one processing device, wherein the at least one processing device comprises a processor coupled to a memory configured to enable the given mobile computing resource to perform the steps of claim 10.

15. A method comprising:
in a system environment comprising a plurality of computing resources, wherein at least a portion of the computing resources are mobile;
a given stationary computing resource of the plurality of computing resources receiving a notification message from at least one mobile computing resource of the plurality of computing resources to retain a portion of a data set when one or more probability values estimate that the mobile computing resource will be in a vicinity of the given stationary computing resource; and
the given stationary computing resource sending the portion of the data set to the mobile computing resource over a communication link locally established between the given stationary computing resource and the mobile computing resource when in the vicinity of one another
wherein the one or more probability values are computed by one or more algorithms of a data distribution process, the one or more algorithms configured to deploy a messaging framework to cause the given stationary computing resource of the plurality of computing resources to receive the notification message from the at least one mobile computing resource; and
wherein the one or more algorithms of the data distribution process are further configured to maximize the amount of data of the portion of the data set that is transferred over the communication link locally established between the given mobile computing resource and the other computing resource when in the vicinity of one another and to minimize the amount of data of the portion of the data set that would otherwise be transferred to the given mobile computing resource over a communication link between the given mobile computing resource and a cellular network in cellular communication with the other computing resource.

16. The method of claim 15, wherein the mobile computing resource is a mobile computing platform in a vehicle and the given stationary computing resource is a fixed unit that is part of a traffic control infrastructure located along a path currently being traversed by the mobile computing platform.

17. The method of claim 15, wherein the notification message is part of the message framework comprising a set of predefined messages exchangeable between the plurality of computing resources in the system environment.

18. An article of manufacture comprising a non-transitory processor-readable storage medium having stored therein program code of one or more software programs, wherein the program code when executed by at least one processing device causes the processing device to perform the steps of claim 15.

19. An apparatus comprising at least one processing device, wherein the at least one processing device comprises a processor coupled to a memory configured to enable the given stationary computing resource to perform the steps of claim 15.

20. The method of claim 15, wherein the one or more algorithms of the data distribution process are further configured to compute an amount of bandwidth that the portion of the data set consumes and determine whether the given mobile computing resource is currently configured with the computed amount of bandwidth.

* * * * *